(12) United States Patent
Lee et al.

(10) Patent No.: US 9,849,878 B2
(45) Date of Patent: Dec. 26, 2017

(54) SYSTEM AND METHOD FOR PROVIDING A CORRECTED LANE FOLLOWING PATH THROUGH A CURVE FOR TRAILERING VEHICLES

(71) Applicant: GM GLOBAL TECHNOLOGY OPERATIONS LLC, Detroit, MI (US)

(72) Inventors: Jin-Woo Lee, Rochester Hills, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 23 days.

(21) Appl. No.: 15/054,705

(22) Filed: Feb. 26, 2016

(65) Prior Publication Data
US 2017/0247032 A1    Aug. 31, 2017

(51) Int. Cl.
| | |
|---|---|
| *B62D 15/02* | (2006.01) |
| *B60W 30/12* | (2006.01) |
| *B62D 13/00* | (2006.01) |
| *B60W 40/072* | (2012.01) |

(52) U.S. Cl.
CPC .......... *B60W 30/12* (2013.01); *B60W 40/072* (2013.01); *B62D 13/00* (2013.01); *B62D 15/021* (2013.01)

(58) Field of Classification Search
USPC ........ 701/23, 1, 41, 25, 31.4, 45, 48, 71, 81
See application file for complete search history.

(56) References Cited

U.S. PATENT DOCUMENTS

| | | | |
|---|---|---|---|
| 7,509,199 B2 * | 3/2009 | Rekow | A01B 69/004 342/357.31 |
| 8,073,594 B2 | 12/2011 | Lee et al. | |
| 8,170,739 B2 | 5/2012 | Lee | |
| 8,190,330 B2 | 5/2012 | Lee | |
| 8,428,843 B2 | 4/2013 | Lee et al. | |
| 2010/0049374 A1 * | 2/2010 | Ferrin | G05D 1/0227 701/1 |
| 2010/4191421 | 7/2010 | Nilsson | |
| 2014/0249691 A1 * | 9/2014 | Hafner | B62D 13/06 701/1 |
| 2015/0232088 A1 * | 8/2015 | Tagesson | B60W 30/02 701/41 |
| 2016/0101811 A1 * | 4/2016 | Kyrtsos | B62D 15/0285 701/25 |
| 2016/0137173 A1 * | 5/2016 | Shah | G01C 21/32 701/40 |

* cited by examiner

*Primary Examiner* — Richard Goldman
(74) *Attorney, Agent, or Firm* — John A. Miller; Miller IP Group, PLC

(57) ABSTRACT

A method for providing vehicle steering control through a curve in an autonomously driven or semi-autonomously driven vehicle that is towing a trailer. The method determines that the trailer will cross out of the travel lane based on the curvature of the curve and the turn radius of the trailer. The method calculates a start turn radius of the vehicle for a start location of the curve, an end turn radius of the vehicle for an end location of the curve, and a turn end point proximate the end location or a turn start point proximate the start location. The method provides initial and boundary conditions for determining a desired path of the vehicle through the curve that prevents the trailer from crossing out of the lane and determines the desired path based on the initial and boundary conditions by solving a polynomial equation.

20 Claims, 8 Drawing Sheets

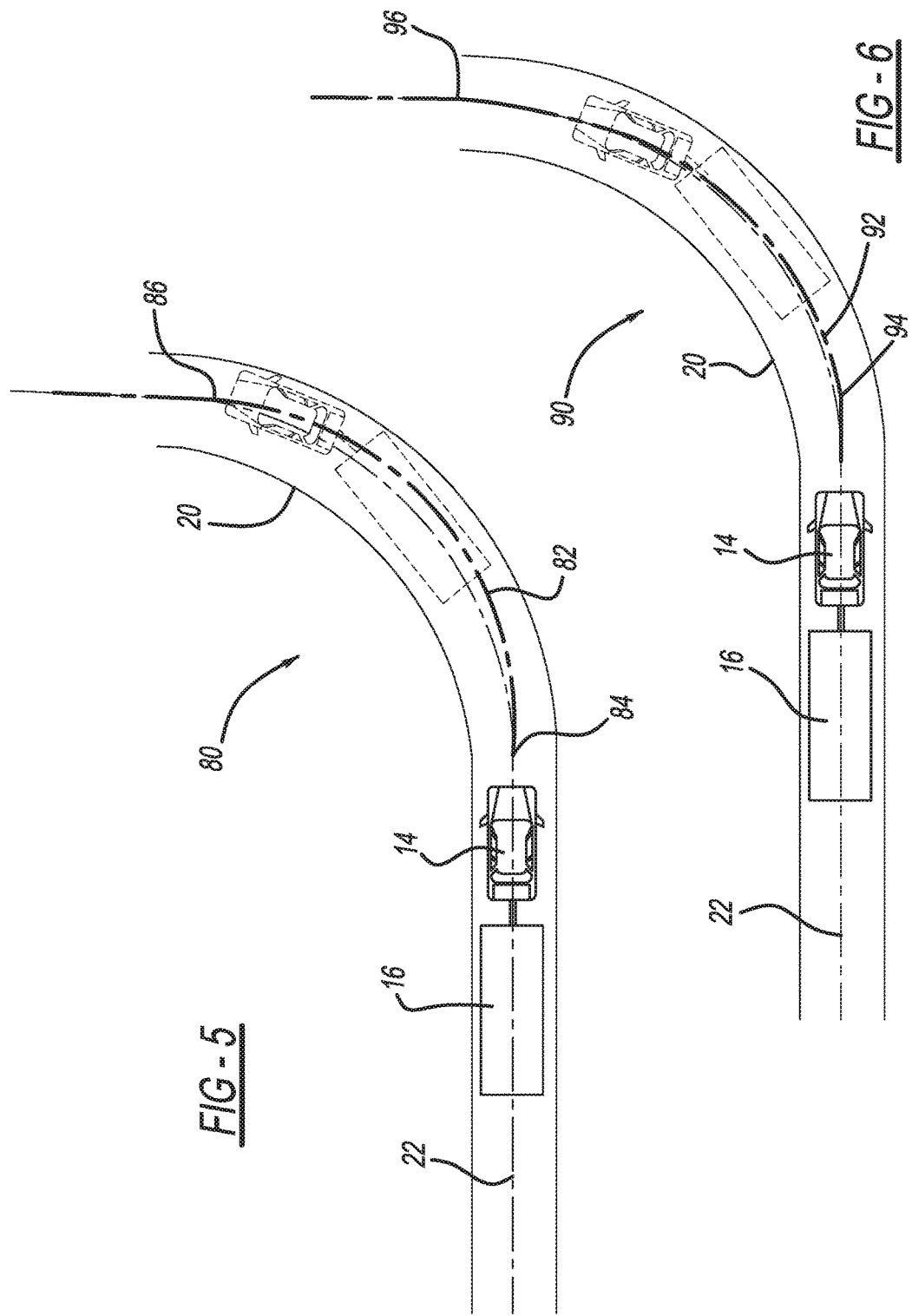

SYSTEM AND METHOD FOR PROVIDING A CORRECTED LANE FOLLOWING PATH THROUGH A CURVE FOR TRAILERING VEHICLES

BACKGROUND OF THE INVENTION

Field of the Invention

This invention relates generally to a system and method for providing lateral control for lane centering, lane keeping and/or lane changing purposes in an autonomously driven or semi-autonomously driven vehicle that is towing a trailer and, more particularly, to a system and method for providing lateral control for lane centering, lane keeping and/or lane changing purposes in an autonomously driven or semi-autonomously driven vehicle that is towing a trailer, where the system provides a corrected vehicle steering path if the trailer will cross out of the vehicle lane when traveling through a curve if the vehicle follows a current path.

Discussion of the Related Art

The operation of modern vehicles is becoming more autonomous, i.e., vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving preceding vehicle is detected using various sensors, such as radar and cameras. Certain modern vehicles also provide autonomous parking where the vehicle will automatically provide the steering control for parking the vehicle. Some vehicle systems provide automatic braking to prevent rear-end collisions. As vehicle systems improve, they will become more autonomous with the goal being a completely autonomously driven vehicle, where future vehicles may employ autonomous systems for lane changing, passing, turns away from traffic, turns into traffic, etc.

U.S. Pat. No. 8,170,739 issued May 1, 2012 to Lee, titled, Path Generation Algorithm for Automated Lane Centering and Lane Changing Control System, assigned to the Assignee of this application and herein incorporated by reference, discloses a system for providing vehicle path generation for automated lane centering and/or lane keeping purposes. The system detects lane markings on the roadway, generates a desired vehicle path in the travel lane, and provides automatic steering that maintains the vehicle in the lane.

Although the system and method for providing path generation for automated lane centering and lane keeping purposes disclosed in the '739 patent is effective for steering the vehicle to stay in the travel lane, the system and method is not applicable for maintaining a towed vehicle in the lane even though the towing vehicle stays in the lane when the vehicle travels around a curve.

SUMMARY OF THE INVENTION

The present disclosure describes a system and method for providing vehicle steering control in an autonomously driven or semi-autonomously driven vehicle that is towing a trailer so as to prevent the trailer from crossing out of a travel lane through a curve that the vehicle is traveling along. The method determines a radius of curvature of road, a lane width of the travel lane, a length of the trailer, and a current steering angle of the vehicle. The method determines a current turn radius of the vehicle for traveling through the curve using the current steering angle and determines a turn radius of the trailer using the current turn radius of the vehicle. The method determines that the trailer will cross out of the travel lane based on the curvature of the curve and the turn radius of the trailer. The method calculates a start turn radius of the vehicle for a start location of the curve, an end turn radius of the vehicle for an end location of the curve, and a turn end point proximate the end location or a turn start point proximate the start location. The method provides initial and boundary conditions for determining a desired path of the vehicle through the curve that prevents the trailer from crossing out of the lane and determines the desired path based on the initial and boundary conditions by solving a polynomial equation.

Additional features of the present invention will become apparent from the following description and appended claims, taken in conjunction with the accompanying drawings.

BRIEF DESCRIPTION OF THE DRAWINGS

FIG. 5 is an illustration of a vehicle towing a trailer and traveling through a curve along a wide turn radius;

FIG. 6 is an illustration of a vehicle towing a trailer and traveling through a curve along a narrow turn radius;

DETAILED DESCRIPTION OF THE EMBODIMENTS

The following discussion of the embodiments of the invention directed to a system and method for providing lateral control for lane centering, lane keeping and/or lane changing purposes in an autonomously driven or semi-autonomously driven vehicle that is towing a trailer is merely exemplary in nature, and is in no way intended to limit the invention or its applications or uses.

Figure 1:
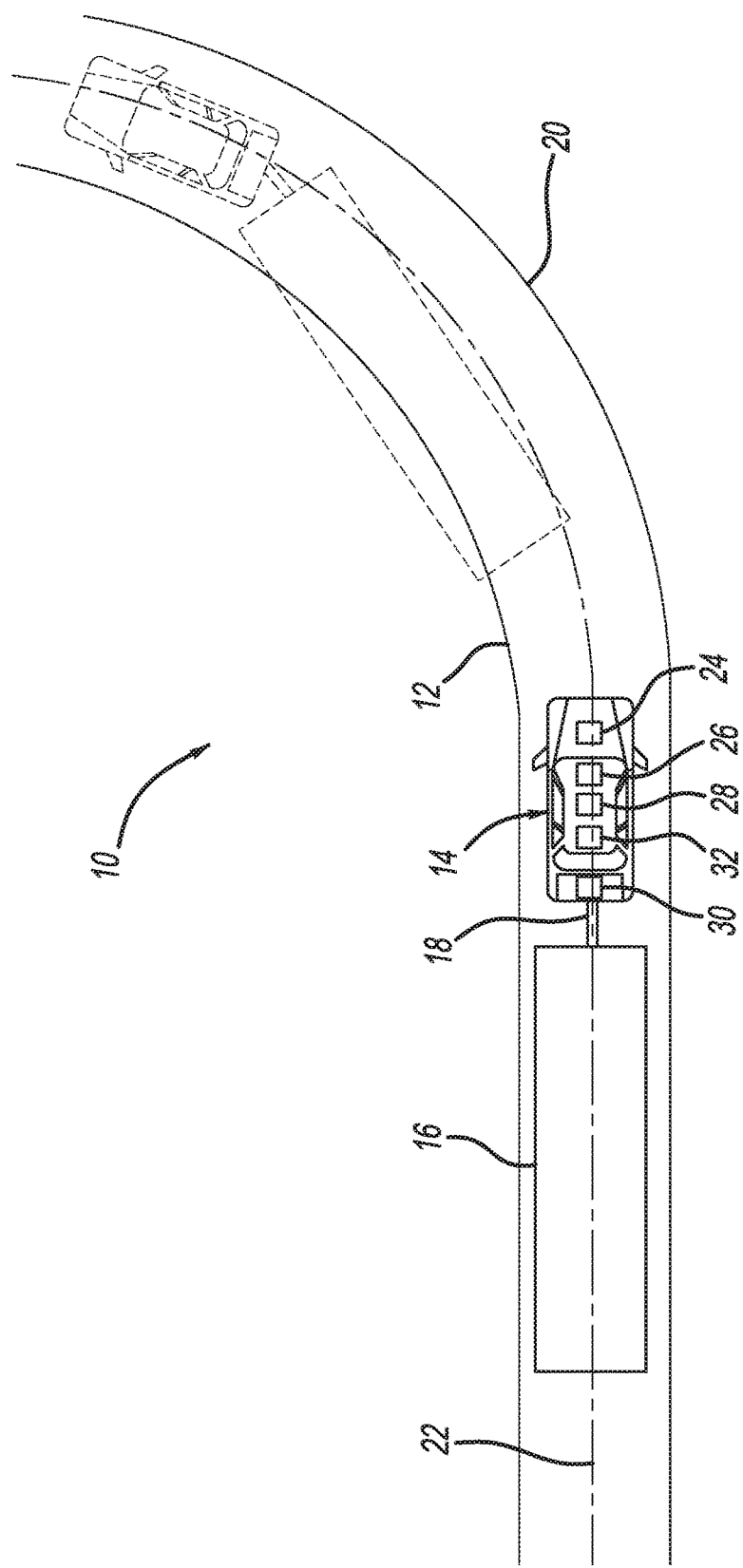
FIG. 1 is an illustration of a vehicle towing a trailer and approaching a curve in a travel lane.

FIG. 1 is an illustration 10 showing a vehicle 14 towing a trailer 16 by a hitch 18 and traveling in a travel lane 12 of a roadway. The trailer 16 is shown merely for representation purposes in that it can be any vehicle being towed by the vehicle 14, such as boats, mobile homes, etc. The vehicle 14 is approaching a curve 20 in the lane 12 and is following along a travel path 22 at the center of the lane 12 that causes the vehicle 14 to stay within the lane 12. The vehicle 14 includes suitable sensors 24, such as cameras, radar, lidar, etc., that may be applicable to detect lane markings, objects, the curve 20, etc., consistent with the discussion herein. The vehicle 14 also includes a map database 26, a display 30, a GPS unit 34 and a controller 28. The controller 28 is intended to represent all of the various modules, controllers, processors, electronic control units (ECUs), etc. that are necessary to perform and operate the various algorithms and processes discussed herein. The map database 26 stores map information at any level of detail that is available, such as the number of travel lanes, travel lane patterns, etc. The travel path 22 can be displayed on the display 30. The vehicle 14 and the trailer 16 are shown in phantom in the illustration 10 when traveling around the curve 20 along the path 22 to show that the vehicle 14 may stay within the travel lane 12, but the trailer 16 may cross out of the lane 12.

As is well understood, vehicles and trailers have a variety of sizes and lengths each possibly having a different wheel base l, trailer length, trailer width, hitch length, etc. that define the turn radius of the vehicle 14 and trailer 16 when going around the curve 20. Further, vehicle roadways may have different widths and roadway curves have different radius of curvatures.

The present invention proposes identifying the predicted path of the vehicle 14 through the curve 20, whether the vehicle 14 is being autonomously driven, semi-autonomously driven and/or mechanically driven, before the vehicle 14 enters the curve 20 to determine whether the trailer 16 will cross out of the lane 12, and if so, provide one or more remedial actions. In one embodiment, if the controller 28 determines that the predicted path of the vehicle 14 will cause the trailer 16 to cross out of the lane 12, then the controller 28 will provide a suitable warning, such as an icon on the display 30, haptic seat, haptic steering wheel, warning chimes, etc., prior to the vehicle 14 reaching the curve 20, such as about 5 seconds before. The display 30 may illustrate the predicted path of the vehicle 14 and the trailer 16. In another embodiment, the controller 28 may not only warn the vehicle driver that the trailer 16 may cross out of the lane 12, but also may show a path on the display 30 that the vehicle 14 should follow so that the trailer 16 does not cross out of the lane 12 when traveling through the curve 20 so as to provide a desired steering path for the driver. In another embodiment, where the vehicle 14 is being autonomously driven, the system will cause the vehicle 14 to be steered along a corrected lane following path or lane keeping path to prevent the trailer 16 from crossing out of the lane 12 in the curve 20.

Figure 2:
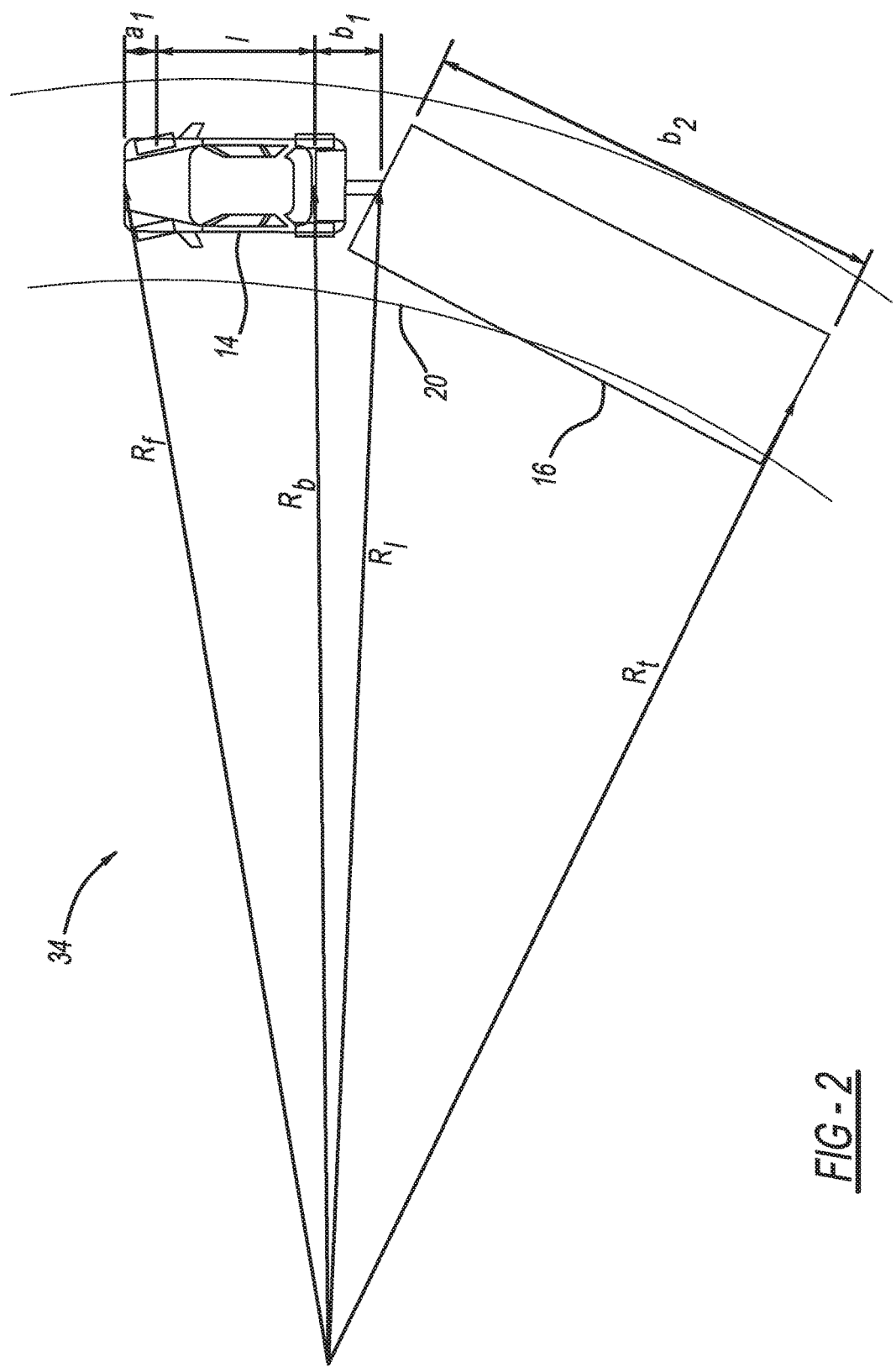
FIG. 2 is an illustration showing the vehicle and the trailer traveling through the curve.

FIG. 2 is an illustration 34 showing the vehicle 14 and the trailer 16 traveling through the curve 20. In the illustration 34, for a particular vehicle steering angle δ and for a particular wheel base l of the vehicle 14, the turn radius $R_f$ at the front of the vehicle 14 through the curve 20 can be calculated as:

$$R_f = \frac{l}{\delta}. \quad (1)$$

Once the turn radius $R_f$ of the vehicle 14 is known, the turn radius $R_b$ at the rear wheels of the vehicle 14, the turn radius $R_i$ at the hitch point of the trailer 16, and the turn radius $R_t$ at the rear of the trailer 16 can be calculated as:

$$R_b = \sqrt{R_f^2 - (l+a_1)^2}, \quad (2)$$

$$R_i = \sqrt{R_f^2 - (l+a_1)^2 + b_1^2}, \quad (3)$$

$$R_t = \sqrt{R_f^2 - (l+a_1)^2 + b_1^2 - b_2^2}, \quad (4)$$

where $a_1$ is the distance between the front wheels and the front bumper of the vehicle 14, $b_1$ is the length of the hitch 18, and $b_2$ is the length of the trailer 16, which would be known or could be calculated from a suitable sensor (not shown). It is noted that the turn radius $R_t$ of the trailer's end point is smaller than the turn radius $R_f$ of the vehicle 14, and the turn radius $R_t$ gets smaller as the length of the trailer 16 gets longer.

In order to determine whether the trailer 16 will cross out of the travel lane 12 when in the curve 20, the radius of curvature of the curve 20 and the width of the trailer 16 need to be known. The radius of curvature of the curve 20 can be obtained from cameras, the map database 26, information from the GPS unit 32, or otherwise, and the turn radius $R_f$ is obtained by equation (1). Using these two radius values, the width of the trailer 16, the width of the lane 12 and equation (4), the controller 28 can determine whether part of the trailer 16 will cross out of the lane 12 in the curve 20 within some predetermined tolerance, such as +/−20 cm. For example, if the width of the lane 12 is 3.5 m, the curve 20 has a 200 m radius of curvature, l is 2.9464 m, $a_1$ is 1.105 m, $b_1$ is 0.55 m, $b_2$ is 14.63 m, and the trailer width is 2.5908 m, the controller 28 can determine using equation (4) that the turn radius $R_t$ at a center of the trailer's end is 199.443 m, which is less than the radius of curvature of the curve 20. By knowing the width of the trailer 16 and the width of the lane 12, the controller 28 can then determine that the end of the trailer 16 will cross out of the travel lane 12, where the controller 28 can then provide a warning to the vehicle driver in advance.

Figure 3:
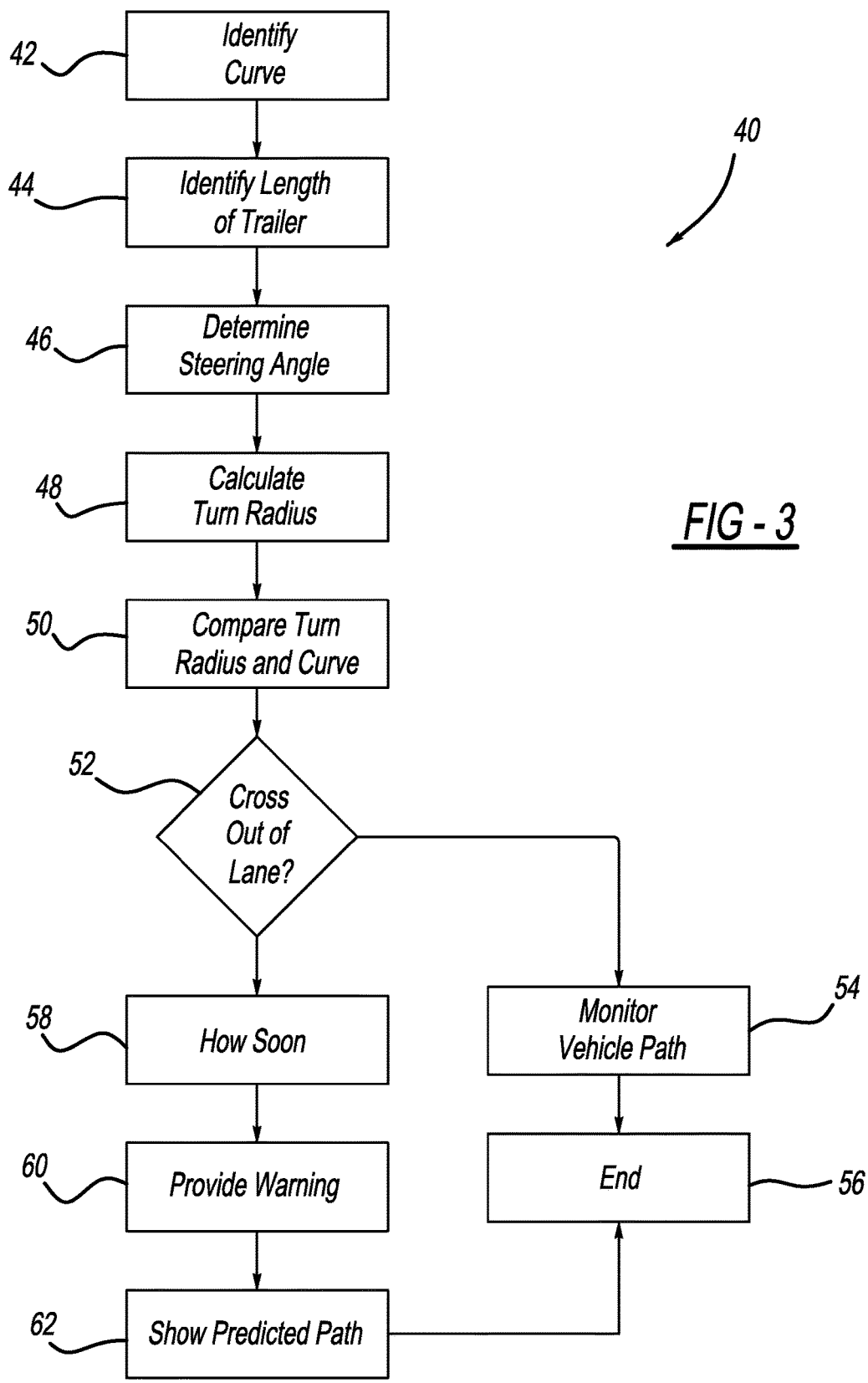
FIG. 3 is a flow chart diagram showing a process for warning a vehicle driver that the trailer may cross out of the lane when traveling through a curve.

FIG. 3 is a flow chart diagram 40 showing a process for determining whether to warn the vehicle driver that the trailer 16 will cross out of the lane 12 when traveling through the curve 20 along the current vehicle path as discussed above. At box 42, the algorithm identifies a curve in the roadway at some predetermined time before the vehicle 14 reaches the curve 20, such as 5 seconds, and also, identifies the radius of the curve 20 and the lane width of the curve 20 at a certain sample time. The algorithm identifies the length of the trailer 16 at box 44 and determines the vehicle steering angle δ at box 46. The algorithm calculates the trailer's turn radius $R_t$ at box 48 in the manner discussed above. The algorithm then compares the trailer's turn radius $R_t$ with the radius of the curve 20 at box 50, and then determines whether the trailer 16 will cross out of the lane 12 using the width of the lane 12 and the width of the trailer 16 at decision diamond 52 within the predetermined tolerance. If the trailer 16 will not cross out of the lane 12 at the decision diamond 52, then the algorithm does not provide a warning and continues to monitor the vehicle path at box 54, and the algorithm ends at box 56. If the algorithm determines that the trailer 16 will cross out of the lane 12 at the decision diamond 52, then the algorithm determines how soon the vehicle 14 will enter the curve 20 at box 58, and provide the warning at box 60 if the vehicle 14 will enter the curve 20 within some predetermined period of time, such as 5 seconds. The algorithm can also show the predicted trailer path on the display 30 at box 62 before the vehicle 14 enters the curve 20.

In addition to warning the vehicle driver that the trailer 16 may cross out of the travel lane 12 for the current vehicle path, the algorithm can also provide recommendations for steering, such as display a vehicle path that the vehicle driver can steer along, to prevent the trailer 16 from crossing out of the travel lane 12. In order to perform this feature, the algorithm determines a desired steering angle $\delta_{desired}$ that will maintain the trailer 16 within the lane 12 once the vehicle 14 has entered the curve 20 as:

$$\delta_{desired} = \frac{2l}{3R_f - R_t}. \quad (5)$$

The algorithm then compares the desired steering angle $\delta_{desired}$ with the current steering angle $\delta_{current}$ when the vehicle 14 has entered the curve 20, and if the desired steering angle $\delta_{desired}$ is different than the current steering angle $\delta_{current}$ outside of some tolerance, then the algorithm will display a change in the vehicle steering path to allow the driver to steer the vehicle 14 along the desired path to prevent the trailer 16 from crossing out of the lane 12. Alternately, or in addition to, the vehicle systems can provide audible instructions to provide more or less left or right turning to maintain the desired steering angle $\delta_{desired}$.

Figure 4:
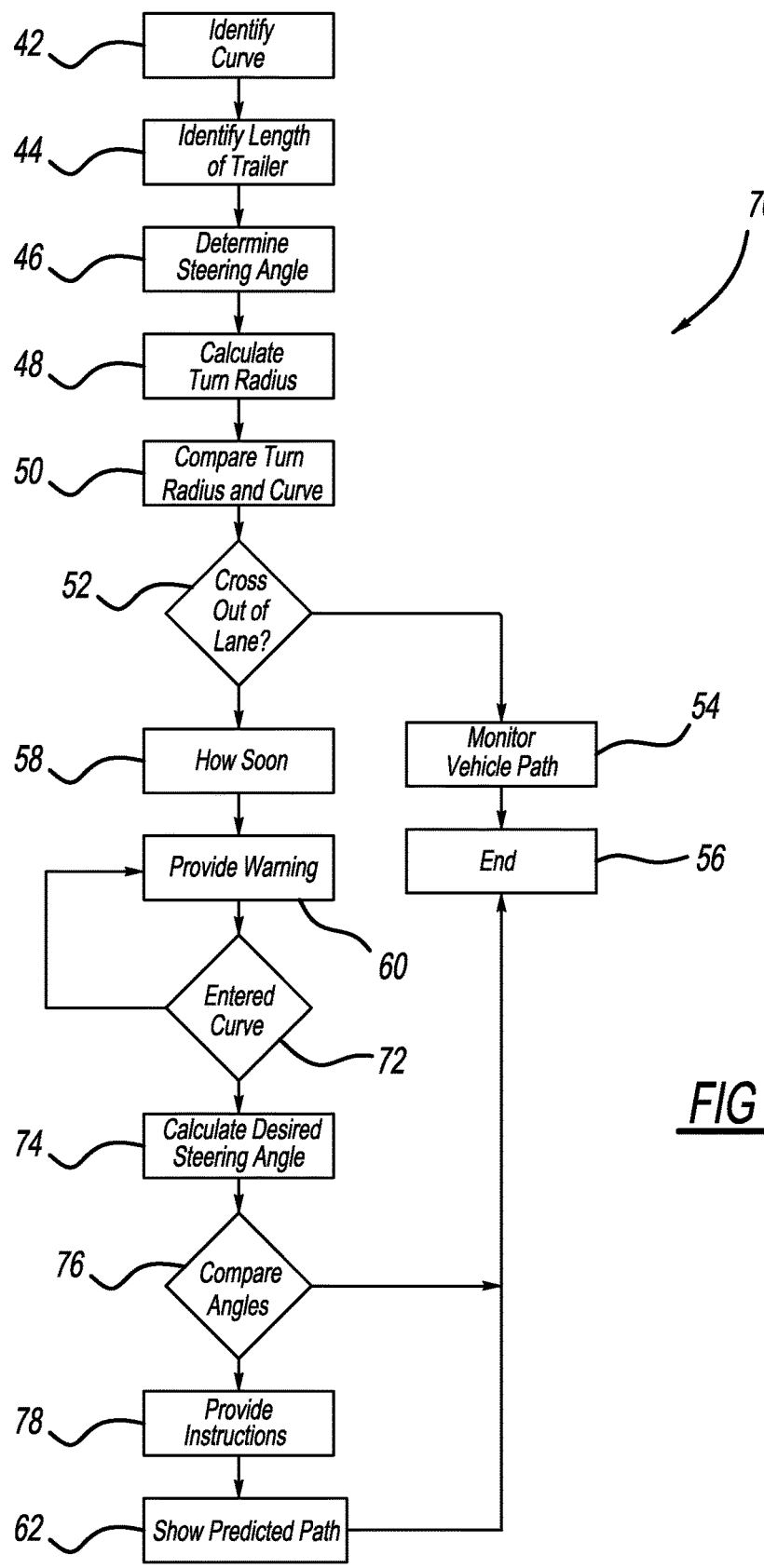
FIG. 4 is a flow chart diagram similar to the flow chart diagram shown in FIG. 3, and including providing turning recommendations for the driver so that the trailer does not cross out of the travel lane.

FIG. 4 is a flow chart diagram 70 showing this embodiment of the invention, where like boxes to the flow chart diagram 40 are identified by the same reference number. In the diagram 70, after the algorithm warns the driver that the trailer 16 may travel outside of the lane 12, the algorithm will determine whether the vehicle 14 has entered the curve 20 at decision diamond 72, and if not, return to the box 60 to continue warning the driver. If the vehicle 14 has entered the curve 20 at the decision diamond 72, then the algorithm calculates the desired steering angle $\delta_{desired}$ to maintain the trailer 16 within the travel lane 12 through the curve 20 at box 74, and then determines whether the difference between the desired steering angle $\delta_{desired}$ and the current steering angle $\delta_{current}$ is within the tolerance at decision diamond 76, where the algorithm ends at box 56 if it is. If the difference between the desired steering angle $\delta_{desired}$ and the current steering angle $\delta_{current}$ is outside of the tolerance at the decision diamond 76, then the algorithm provides instructions for the driver for a different steering angle at box 78, and shows the trailer path at the box 62.

In a second aspect of the invention, the vehicle 14 is being driven autonomously or semi-autonomously, where the vehicle is being controlled by determining the desired vehicle path and automatically steering the vehicle 14 along that path. In this embodiment, in order to prevent the trailer 16 from crossing out of the lane 12 along the curve 20, the algorithm generates a corrected lane following or lane keeping path, if necessary, for the vehicle 14 to be steered along through the curve 20 considering the trailer's turn radius $R_t$, the road curvature $\rho$, i.e., the road radius, the lane width, the trailer length $b_2$, the vehicle wheel base l, etc., as discussed above.

The lane following or lane keeping algorithm may provide two different path planning approaches for navigating through the curve 20. In a first turning approach, the algorithm calculates a vehicle path that provides a wide turn through the curve 20, where the turn starts at the beginning of the curve. This approach is illustrated in FIG. 5 by illustration 80 showing the vehicle 14 as it enters the curve 20 and in phantom in the curve 20. In this approach, the vehicle 14 begins its turn from the current path 22 to a wide turn path 82 at the very beginning of the curve 20 identified by a turn start point 84. Because this is a wider turn through the curve 20, the turn will end at point 86 before the end of the curve 20, where the vehicle 14 will begin traveling straight. In this embodiment, the start turn radius of the vehicle 14 at the point 84 is $R_f$, which is 200 m in the example above, the end turn radius of the vehicle 14 at the point 86 is $$\frac{3R_f - R_t}{2},$$

which is 200.28 m in the example above, and the turn end point before the end of the curve 20 is:

$$\sqrt{R_f^2 - \left(\frac{R_f + R_t}{2}\right)^2}, \quad (6)$$

which is 10.55 m before the end of the curve 20 in the example above.

A second turning approach provides a narrow turn from the path 22, but having a later turn start while the vehicle 14 is in the curve 20. This approach is illustrated in FIG. 6 by illustration 90 showing the vehicle 14 as it enters the curve 20 and in phantom in the curve 20. In this approach, the vehicle 14 begins its turn from the current path 22 to a narrow turn path 92 after the beginning of the curve 20 identified by a turn start point 94. Because this is a narrower turn through the curve 20, the turn will end at point 96 at the very end of the curve 20 where the vehicle 14 will begin traveling straight. In this embodiment, the start turn radius of the vehicle 14 at the point 94 is $$\frac{3R_f - R_t}{2},$$

which is 200.28 m in the example above, the end turn radius of the vehicle 14 at the point 96 is $R_f$, which is 200 m in the example above, and the turn start point after the beginning of the curve 20 is:

$$\sqrt{R_f^2 - \left(\frac{R_f + R_t}{2}\right)^2}, \quad (7)$$

which is 10.55 m after the beginning of the curve 20 in the example above.

Figure 7:
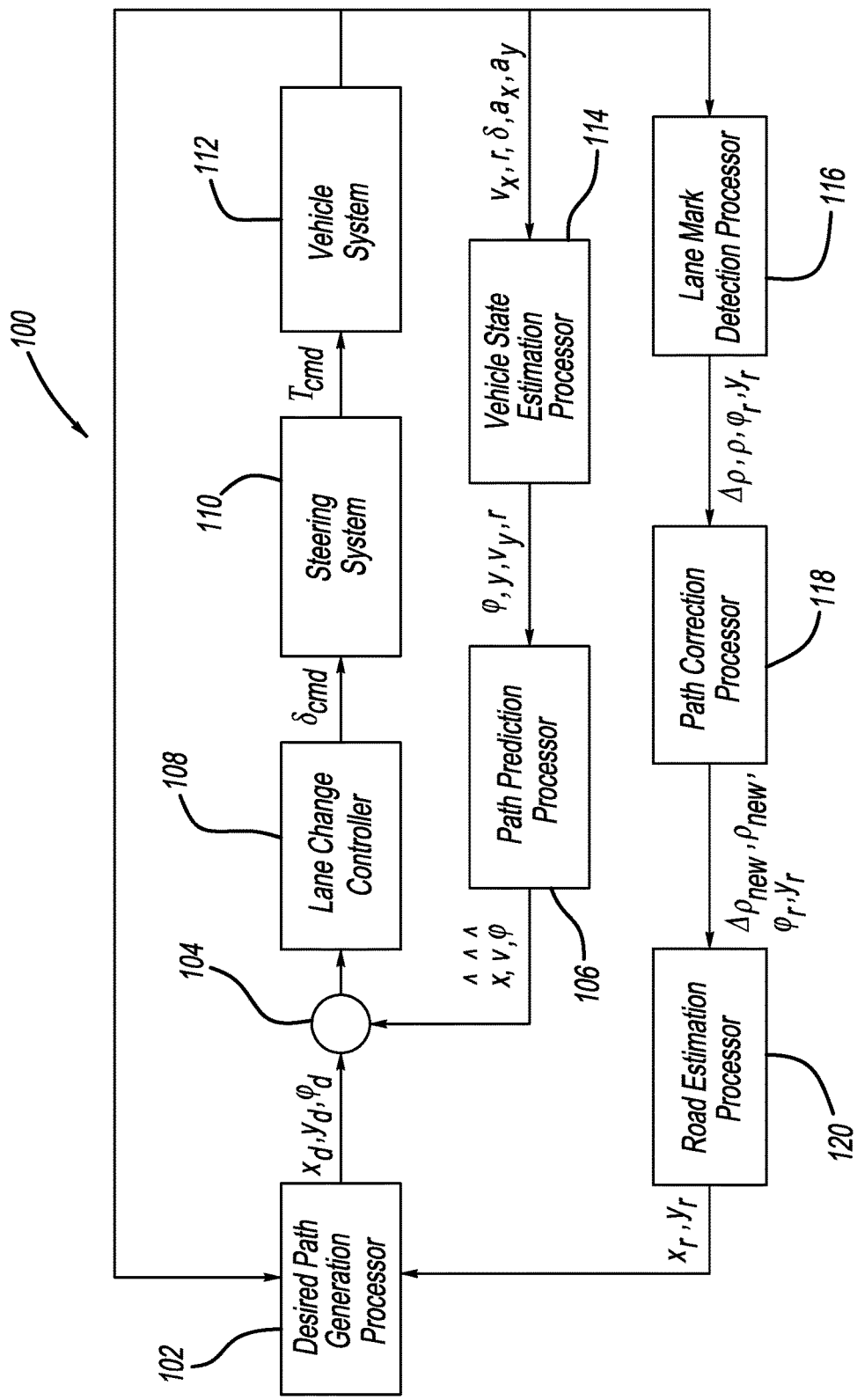
FIG. 7 is a block diagram of a path prediction system for providing automated vehicle steering.

FIG. 7 is a schematic block diagram of a system 100 that provides autonomous path control for a vehicle when changing lanes, either on a straight road or a curved road, and lane centering in an autonomous or semi-autonomous vehicle system. The discussion below is a general discussion of providing a desired path in an autonomously driven or semi-autonomously driven vehicle as more specifically discussed in the '739 patent. The system 100 includes a desired path generation processor 102 that generates a desired steering path for the vehicle 14. For any purpose, such as lane changing, curve navigation, object avoidance, etc., the desired steering path is represented as a series of lateral offsets, heading angles and longitudinal distances over a time period that the steering change will take place.

The system 100 uses measured roadway parameters, such as vehicle lateral offset $y_r$, roadway curvature $\rho$ and vehicle yaw angle $\varphi_r$, with respect to the vehicle's centered coordinate system at the path generation processor 102. The roadway is modeled as a second order polynomial equation as:

$$y_r(x) = Ax^2 + Bx + C, 0 \leq X \leq x_{range} \quad (8)$$

where $x_{range}$ represents the range of a forward vision camera on the vehicle 14.

From the geometric relationship between the roadway and the roadway representation of equation (8), the coefficients of equation (8) with the measured roadway parameters $y_r$, $\rho$ and $\varphi_r$ can be related as:

$$A = \frac{\rho}{2}, \quad (9)$$

$$B = \tan \varphi_r, \quad (10)$$

$$C = y_r(0). \quad (11)$$

Using the roadway lateral offset $y_r$, the heading angle $\varphi_r$ and the roadway curvature $\rho$, the path generation processor 102 generates a smooth desired path by solving a fifth order polynomial equation provided as:

$$y_d(t) = a_5 x_d^5(t) + a_4 x_d^4(t) + a_3 x_d^3(t) + a_2 x_d^2(t) + a_1 x_d^1(t) + a_0. \quad (12)$$

The fifth order polynomial path generation captures the roadway parameters $y_r$, $\rho$ and $\varphi_r$ at the beginning and the end of the path and guarantees the smoothness of the path up to the second order path derivatives. In addition, the path can be obtained by a few simple algebraic computations using the road geometry measurement, thus it does not require heavy computing power.

This path information including state variable $x_d$, lateral position $y_d$, and heading angle $\varphi_d$ is provided to a comparator 104 that receives a signal identifying a predicted vehicle path from a path prediction processor 106, discussed below, and provides an error signal between the desired path and the predicted path. The lateral speed $v_y$, the yaw angle $\varphi$ and the lateral position $y_r$ of the vehicle 14 are predicted or estimated over the turn change completion time. After the roadway model of equation (8) is obtained, the roadway lateral position $y_r$ and the yaw angle $\varphi_r$ can be predicted at the path prediction processor 106 using a vehicle dynamic model:

$$\dot{x}_r = A_r x_r + B_r \delta + G_r \rho, \quad (13)$$

$$z_r = c_r x_r, \quad (14)$$

with:

$$x_r = [y_r \; \varphi_r \; v_y \; r]^T, \quad (15)$$

$$B_r = \begin{bmatrix} 0 & 0 & \dfrac{C_f}{m} & \dfrac{aC_f}{I} \end{bmatrix}^T, \quad (16)$$

$$C_r = \begin{bmatrix} 1 & 0 & 0 & 0 \\ 0 & 1 & 0 & 0 \end{bmatrix}, \quad (17)$$

$$G_r = [0 \; v_x \; 0 \; 0]^T, \quad (18)$$

$$A_r = \begin{bmatrix} 0 & v_x & -1 & 0 \\ 0 & 0 & 0 & -1 \\ 0 & 0 & -\dfrac{C_f + C_r}{mv_x} & \dfrac{bC_r - aC_f}{mv_x} - v_x \\ 0 & 0 & \dfrac{bC_r - aC_f}{Iv_x} & -\dfrac{a^2 C_f + b^2 C_r}{Iv_x} \end{bmatrix}, \quad (19)$$

where $c_f$ and $c_r$ are the concerning stiffnesses of the front wheels and rear wheels of the vehicle 14, respectively, a and b are the distances from the center of gravity of the vehicle 14 to the front and rear axles, respectively, m is the vehicle mass, $\delta$ is the steering angle and $I_z$ is the moment of inertia around the center of mass of the vehicle 14 perpendicular to the plane where the vehicle 14 is located.

The error signal from the comparator 104 is sent to a lane change controller 108 that provides a steering angle command signal $\delta_{cmd}$ for path steering that minimizes the error signal. The lane change controller 108 generates a sequence of future steering angle commands $\delta_{cmd}$ that minimize the orientation and offset errors between the desired vehicle path and the predicted vehicle path. A lateral motion control algorithm in the controller 108 compares the predicted vehicle path to the vehicle's desired path $(x_d, y_d)$, and calculates the steering angle command signal $\delta_{cmd}$ by minimizing the path difference, where the steering angle command signal $\delta_{cmd}$ is obtained by:

$$\delta_{cmd}(k) = \frac{\sum_{i=0}^{N-1}(z_d(k+i+1) - CA^{i+1}x(k))^T Q(k+i+1)(CA^i B)}{\sum_{i=0}^{N-1}(CA^i B) Q(k+i+1)(CA^i B) + R(k)}, \quad (20)$$

and where $x = [y \; \varphi \; v_y \; r]^T$, $z_d(k) = [y_d \; \varphi_d]^T$, Q and R are weighting matrices used in the minimization with the system matrices definitions $$A = e^{A_r t_s}, \; B = \int_0^{t_s} e^{A_r \alpha} B_r d\alpha$$

and $$C = \begin{bmatrix} 1 & 0 & 0 & 0 \\ 0 & 1 & 0 & 0 \end{bmatrix}.$$

The steering angle command signal $\delta_{cmd}$ is sent to a steering system 110 that provides the steering control for a vehicle system 112. The steering system 110 receives the steering angle command signal $\delta_{cmd}$ and provides a steering torque command signal $\tau_{cmd}$ to achieve the desired steering angle $\delta_{desired}$ as commanded.

As the vehicle 14 turns, various sensors on the vehicle 14, such as a steering angle sensor, speedometer and yaw rate sensor, provide measured signals of the motion of the vehicle 14. These measured vehicle motion signals are sent from the vehicle system 112 to the desired path generation processor 102. Inertial sensors, such as a speedometer, a rate gyro and a steering angle sensor, can be used to measure vehicle states, such as longitudinal speed $v_x$, longitudinal acceleration $a_x$, lateral acceleration $a_y$, yaw rate r and steering angle $\delta$. The lateral speed $v_y$ is estimated as:

$$\begin{bmatrix} \dot{\hat{v}}_y \\ \dot{\hat{r}} \end{bmatrix} = \begin{bmatrix} -\dfrac{C_f + C_r}{mv_x} & \dfrac{bC_r - aC_f}{mv_x} - v_x \\ \dfrac{bC_r - aC_f}{Iv_x} & -\dfrac{a^2 C_f + b^2 C_r}{Iv_x} \end{bmatrix} \cdot \begin{bmatrix} \hat{v}_y \\ \hat{r} \end{bmatrix} + \begin{bmatrix} \dfrac{C_f}{m} \\ \dfrac{aC_f}{I} \end{bmatrix} \cdot \delta + \quad (21)$$

-continued $$K \cdot \begin{bmatrix} 0 \\ r - \hat{r} \end{bmatrix},$$

where r is a measured vehicle yaw rate, $\hat{v}_y$ and $\hat{r}$ are the estimated lateral speed and the vehicle yaw rate, respectively, and K is a yaw rate observer gain.

The vehicle motion information is also provided to a vehicle state estimation processor 114 that provides estimated vehicle state signals, namely, lateral offset y, yaw angle φ, vehicle lateral speed $v_y$, and vehicle yaw rate r. The vehicle state estimation processor 114 uses a vehicle model to filter the estimated vehicle state signals. The state signals are sent to the path prediction processor 106 that predicts the vehicle path for the next few instances in time based on that information as discussed above. The path prediction processor 106 estimates the vehicle future path based on the current vehicle speed $v_x$, yaw rate r and steering angle δ.

The camera signals and the filtered sensor signals from the vehicle system 112 are also provided to a lane mark detection processor 116 that corrects the parameters of the lane markings based on the motion of the vehicle 14. The lane mark detection processor 116 recognizes the lane markings in the roadway and represents them with the parameters of lane curvature, tangential angle and lateral offset, where the output of the lane mark detection processor 116 is the yaw angle $\varphi_r$, the lateral position $y_r$, the curvature ρ of the roadway and a rate of change in the roadway curvature Δρ of the roadway. The position of the lane markings relative to the vehicle 14 is then sent to the desired path generation processor 102 through a roadway estimation processor 120 to provide the desired path generation updating.

When the curve 20 is detected, the present invention proposes correcting the desired steering path to prevent the trailer 16 from crossing out of the lane 12 as it travels around the curve 20. More particularly, the path control algorithm revises the roadway curvature ρ and the rate of change in the roadway curvature Δρ with a new roadway curvature $\rho_{new}$ and a new rate of change in roadway curvature $\Delta\rho_{new}$ in a path correction processor 118 that is then used by the road estimation processor 120. If no curve is detected, then the roadway curvature ρ and the rate of change in the roadway curvature Δρ pass unchanged through the processor 118. Specifically, for the wide turn path approach the processor 118 calculates the new roadway curvature $\rho_{new}$ and the new rate of change in roadway curvature $\Delta\rho_{new}$ as:

$$\rho_{new} = \frac{1}{R_f}, \quad (22)$$

$$\Delta\rho_{new} = \frac{2}{D(R_f - R_t)}, \quad (23)$$

and for the narrow turn approach the processor 118 calculates the new roadway curvature $\rho_{new}$ and the new rate of change in roadway curvature $\Delta\rho_{new}$ as:

$$\rho_{new} = \frac{2}{3R_f - R_t}, \quad (24)$$

$$\Delta\rho_{new} = \frac{2}{D(R_f - R_t)}, \quad (25)$$

where D is a tuning parameter to adjust for driver aggressiveness.

When the lane centering or lane keeping algorithm identifies the curve 20, the algorithm uses the start point, the end point and the rate of change in the roadway curvature $\Delta\rho_{new}$ in combination with the path generation operation in the path generation processor 102 for either the wide turn approach or the narrow turn approach, where the algorithm will be previously programmed with one or the other of the wide turn approach or the narrow turn approach. For both of these approaches, the fifth order polynomial of equation (12) is solved with different initial and boundary conditions by first normalizing the polynomial trajectory as:

$$y_n(x_n) = a_0 + a_1 x_n + a_2 x_n^2 + a_3 x_n^3 + a_4 x_n^4 + a_5 x_n^5, \quad (26)$$

$$0 \le x_n = \frac{x}{v_x \Delta T} \le 1, \quad (27)$$

$$y_n = y/L, \quad (28)$$

where L is the lane width and ΔT is the time for the vehicle 14 to travel through the lane 12.

For the wide turn approach, initial conditions for the start point 84 are given as:

$$y_n(0) = 0, \quad (29)$$

$$y'_n(0) = 0, \quad (30)$$

$$y''_n(0) = \frac{(v_x \Delta T)^2}{R_f L}, \quad (31)$$

and boundary conditions for the end point 86 are given as:

$$y_n(1) = \frac{y_{lane}(v_x \Delta T) + L}{L}, \quad (32)$$

$$y'_n(1) = y'_{lane}(v_x \Delta T) \cdot \frac{v_x \Delta T}{L}, \quad (33)$$

$$y''_n(1) = \frac{2(v_x \Delta T)^2}{(3R_f - R_t)L}, \quad (34)$$

where:

$$y_{lane} = c_3 x^3 c_2 x^2 c_1 x + c_0, \quad (35)$$

and where $c_0$, $c_1$, $c_2$ and $c_3$ are measured values from a front camera.

For the narrow turn approach, different initial and boundary conditions are used to solve the polynomial equation (26), where the initial conditions for the start point 94 are given as:

$$y_n(0) = 0, \quad (36)$$

$$y'_n(0) = 0, \quad (37)$$

$$y''_n(0) = \frac{2(v_x \Delta T)^2}{(3R_f - R_t)L}, \quad (38)$$

and the boundary conditions for the end point 96 are given as:

$$y_n(1) = \frac{y_{lane}(v_x\Delta T) + L}{L}, \quad (39)$$

$$y'_n(1) = y'_{lane}(v_x\Delta T) \cdot \frac{v_x\Delta T}{L}, \quad (40)$$

$$y''_n(1) = \frac{2(v_x\Delta T)^2}{R_f L}. \quad (41)$$

Figure 8:
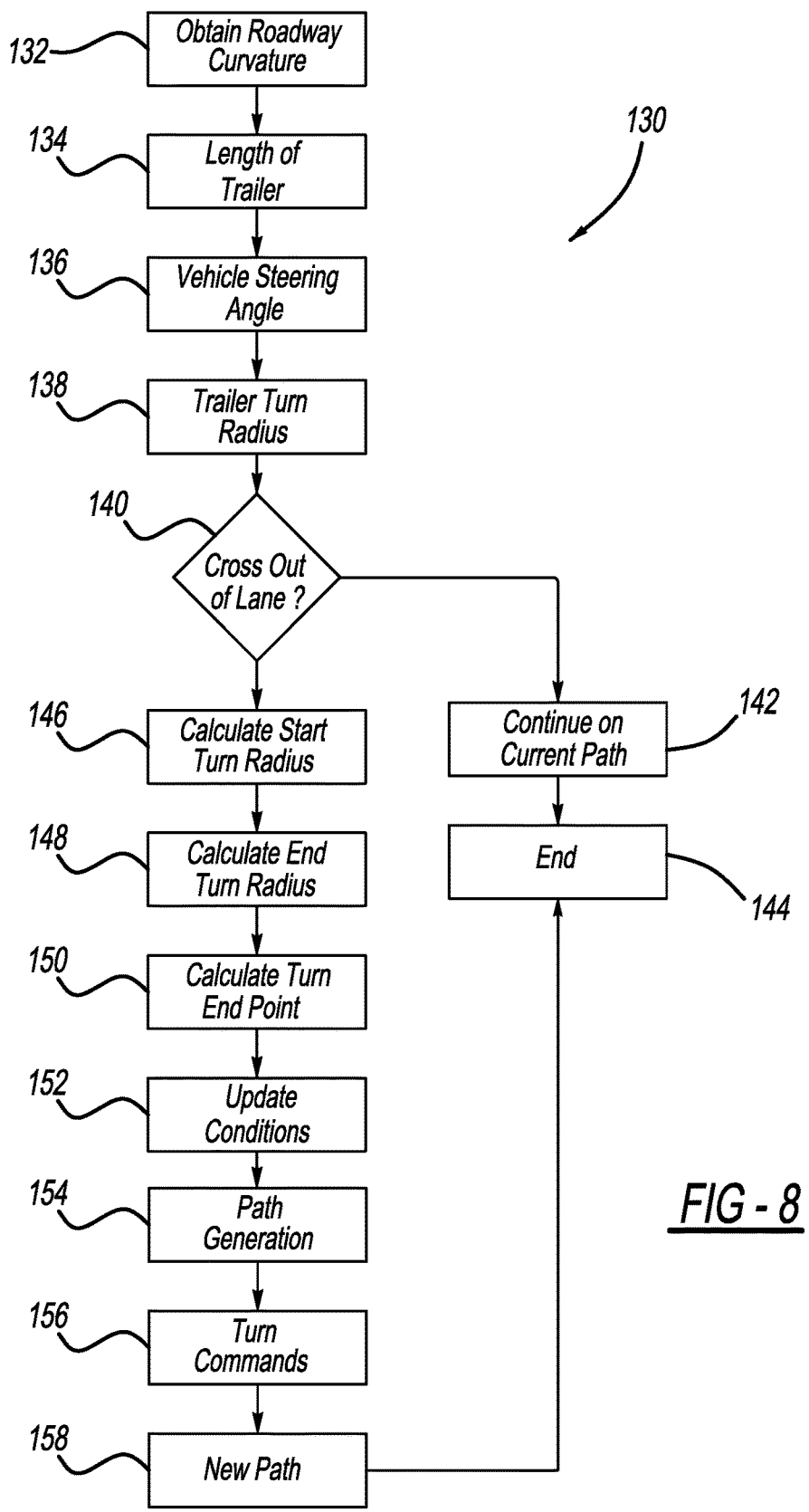
FIG. 8 is a flow chart diagram showing a process for providing a path for the vehicle to follow for the wide turn radius.

FIG. 8 is a flow chart diagram 130 showing a process for calculating the path 82 for the wide turn approach when the vehicle 14 enters the curve 20 as discussed above. At box 132, the algorithm obtains the roadway curvature ρ, the lane width, and the necessary measurements from the map database 26 and the forward looking camera on the vehicle 14. The algorithm obtains the length of the trailer 16 at box 134 and obtains the vehicle steering angle δ at box 136. The algorithm then calculates the trailer's turn radius $R_t$ at box 138 and determines whether based on the current path of the vehicle 14 the trailer 16 will cross out of the lane 12 in the curve 20 at decision diamond 140. If the trailer 16 will not cross out of the lane 12 during the turn through the curve 20 at the decision diamond 140, then the algorithm will cause the vehicle 14 to continue along its current path at box 142, and the algorithm will end at box 144. If the trailer 16 will cross out of the lane 12 for the current vehicle path at the decision diamond 140, then the algorithm calculates the start turn radius $R_f$ of the vehicle 14 at box 146, calculates the end turn radius $$\frac{3R_f - R_t}{2}$$

of the vehicle 14 at box 148, and calculates the turn end point 86 from equation (6) before the end of the curve 20 at box 150. The algorithm will then update the initial boundary and conditions for the path generation problem from equations (29)-(34) at box 152 and use those conditions for the path generation operation in the processor 92 at box 154. The algorithm will then provide the necessary turning commands for the new path at box 156 and report the new trailer path to the driver at box 158.

Figure 9:
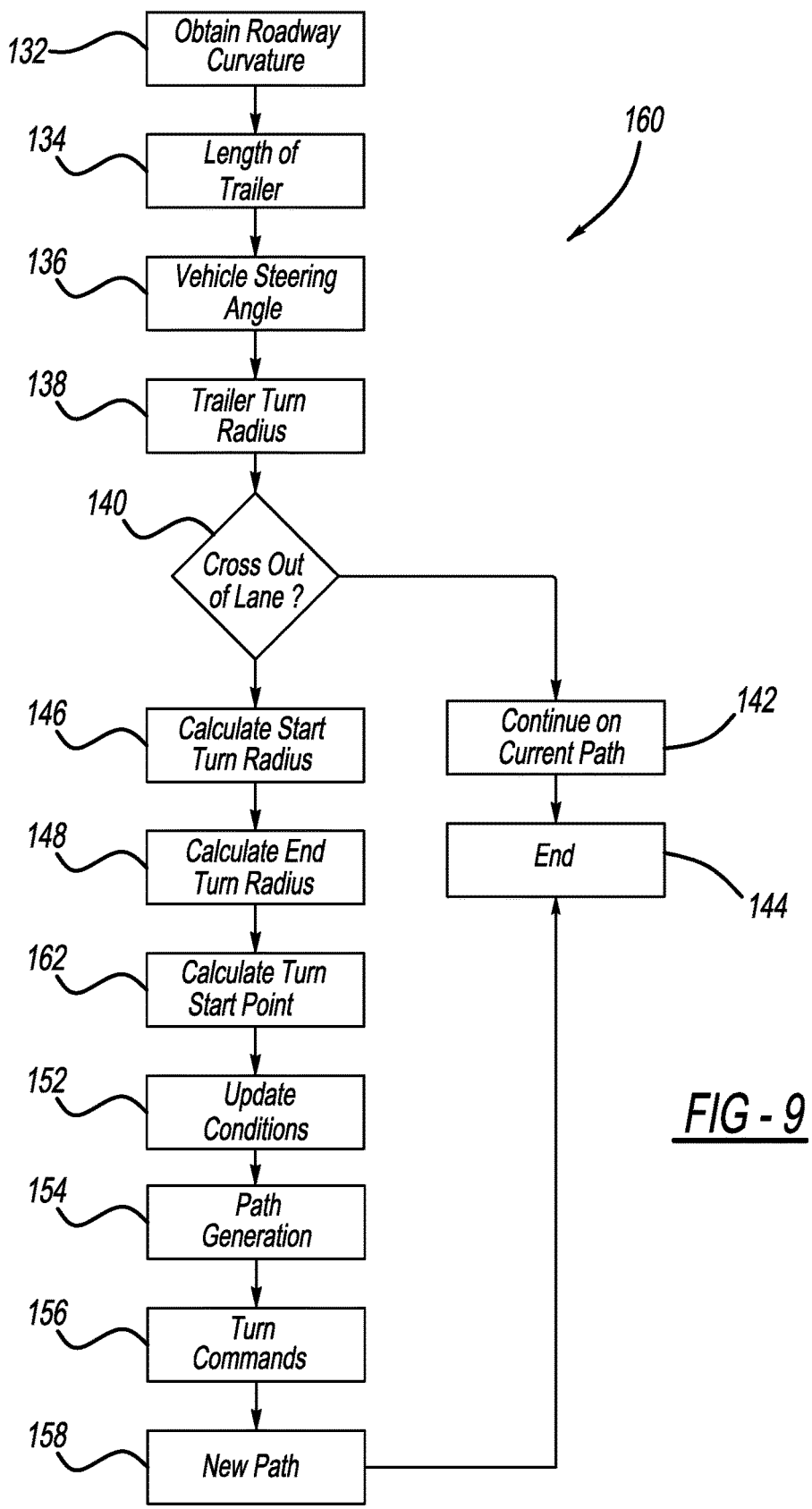
FIG. 9 is a flow chart diagram showing a process for providing a path for a vehicle to follow for the narrow turn radius.

FIG. 9 is a flow chart diagram 160 showing a process for calculating the path 92 for the narrow turn approach when the vehicle 14 enters the curve 20, as discussed above, that is the same as the steps in the flow chart diagram 130, except that the algorithm calculates the turn start point from equation (7) at box 162 instead of the end point of the turn at the box 150. Further, the start turn radius is $$\frac{3R_f - R_t}{2}$$

at the box 146, the end turn radius is $R_f$ at the box 148 and the initial and boundary conditions at the box 152 are obtained from equations (36)-(41).

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing vehicle steering control in an autonomously driven or semi-autonomously driven vehicle that is towing a trailer so as to prevent the trailer from crossing out of a travel lane in a curve that the vehicle is traveling along, said method comprising:
   using a processor programmed for:
      determining a radius of curvature of the curve, a width of the travel lane, and a length of the trailer;
      determining when the vehicle has entered the curve;
      determining a current steering angle of the vehicle;
      determining a current turn radius of the vehicle for traveling through the curve using the current steering angle;
      determining a turn radius of the trailer using the current turn radius of the vehicle and other parameters;
      determining that the trailer will cross out of the travel lane based on the radius of curvature of the curve and the turn radius of the trailer;
      calculating a start turn radius of the vehicle for a start location of the curve;
      calculating an end turn radius of the vehicle for an end location of the curve;
      determining a turning end point proximate the end location;
      determining a turning start point proximate the start location; and
      determining a desired path of the vehicle through the curve that prevents the trailer from crossing out of the lane that includes solving a polynomial equation using the start turn radius, the end turn radius and the turning end point or the turning start point; and
   steering the vehicle using a steering system along the desired path through the curve.

2. The method according to claim 1 wherein determining the desired path includes solving the polynomial equation as:

$$y_n(x_n) = a_0 + a_1 x_n + a_2 x_n^2 + a_3 x_n^3 + a_4 x_n^4 + a_5 x_n^5,$$

$$0 \leq x_n = \frac{x}{v_x \Delta T} \leq 1,$$

$$y_n = y/L,$$

where x is vehicle longitudinal travel distance, y is vehicle lateral travel distance with respect to a current vehicle location, $v_x$ is vehicle speed, $a_0$-$a_5$ are coefficients, L is the width of the travel lane, and $\Delta T$ is the time for traveling through the curve.

3. The method according to claim 2 wherein determining the desired path includes determining a desired path through the curve that starts at a beginning location of the curve, has a relatively wide turn through the curve, and ends before an ending location of the curve.

4. The method according to claim 3 further comprising providing initial conditions to solve the polynomial equation at the turning start point as:

$$y_n(0)=0,$$

$$y'_n(0)=0,$$

$$y''_n(0) = \frac{(v_x \Delta T)^2}{R_f L},$$

and providing boundary conditions to solve the polynomial equation at the turning end point as:

$$y_n(1) = \frac{y_{lane}(v_x \Delta T) + L}{L},$$

$$y'_n(1) = y'_{lane}(v_x \Delta T) \cdot \frac{v_x \Delta T}{L},$$

$$y''_n(1) = \frac{2(v_x \Delta T)^2}{(3R_f - R_t)L},$$

where:

$$y_{lane} = c_3 x^3 + c_2 x^2 + c_1 x + c_0,$$

and where ( )' is a first order derivative, ( )'' is a second order derivative $R_f$ is the current turn radius of the vehicle, $R_t$ is the turn radius of the trailer, $y_{lane}$ is a polynomial representation of lane centering, and $c_0$-$c_3$ are coefficients of the polynomial equation given by lane sensing.

5. The method according to claim 3 wherein the start turn radius is $R_f$, the end turn radius is $$\frac{3R_f - R_t}{2},$$

and the turning end point before the end location of the curve is:

$$\sqrt{R_f^2 - \left(\frac{R_f + R_t}{2}\right)^2},$$

where $R_f$ is the current turn radius of the vehicle and $R_t$ is the turn radius of the trailer.

6. The method according to claim 2 wherein determining the desired path includes determining a desired path through the curve that starts after a beginning location of the curve, has a relatively narrow turn through the curve, and ends at an ending location of the curve.

7. The method according to claim 6 further comprising providing initial conditions to solve the polynomial equation at the turning start point as:

$$y_n(0)=0,$$

$$y'_n(0)=0,$$

$$y''_n(0) = \frac{2(v_x \Delta T)^2}{(3R_f - R_t)L},$$

and providing boundary conditions to solve the polynomial equation at the turning end point as:

$$y_n(1) = \frac{y_{lane}(v_x \Delta T) + L}{L},$$

$$y'_n(1) = y'_{lane}(v_x \Delta T) \cdot \frac{v_x \Delta T}{L},$$

$$y''_n(1) = \frac{2(v_x \Delta T)^2}{R_f L},$$

where:

$$y_{lane} = c_3 x^3 + c_2 x^2 + c_1 x + c_0,$$

and where ( )' is a first order derivative, ( )'' is a second order derivative $R_f$ is the current turn radius of the vehicle, $R_t$ is the turn radius of the trailer, $y_{lane}$ is a polynomial representation of lane centering, and $c_0$-$c_3$ are coefficients of the polynomial equation given by lane sensing.

8. The method according to claim 6 wherein the start turn radius is $$\frac{3R_f - R_t}{2},$$

the end turn radius is $R_f$, and the turning start point after the start location of the curve is:

$$R_f^2 - \left(\frac{R_f + R_t}{2}\right)^2,$$

where $R_f$ is the current turn radius of the vehicle and $R_t$ is the turn radius of the trailer.

9. The method according to claim 1 wherein determining the desired path includes providing a revised road curvature value of $1/R_f$ and a change in rate of road curvature as $$\frac{2}{D(R_f - R_t)},$$

where $R_f$ is the current turn radius of the vehicle, $R_t$ is the turn radius of the trailer, and D is a tuning parameter to adjust for driver aggressiveness.

10. The method according to claim 1 wherein determining a turn radius of the trailer includes determining a turn radius of a rear end of the trailer based on the turn radius of the vehicle, a wheel base of the vehicle, a distance from front wheels of the vehicle to a front bumper of the vehicle, a hitch length between the vehicle and the trailer, and a length of the trailer.

11. The method according to claim 10 wherein determining a turn radius of the rear end of the trailer includes using the equation:

$$R_t = \sqrt{R_f^2 - (l+a_1)^2 + b_1^2 - b_2^2},$$

where $R_t$ is the turn radius of the trailer, l is the wheel base of the vehicle, $a_1$ is the distance from the front bumper to the front wheels of the vehicle, $b_1$ is the hitch length and $b_2$ is the length of the trailer, and $R_f$ is the turn radius of the vehicle and is $$\frac{l}{\delta},$$

where $\delta$ is the steering angle.

12. The method according to claim 1 wherein determining that the trailer will cross out of the travel lane includes comparing the turn radius of the trailer to the curvature of the curve using a width of the trailer and a width of the travel lane.

13. A method for providing vehicle steering control in an autonomously driven or semi-autonomously driven vehicle that is towing a trailer so as to prevent the trailer from crossing out of a travel lane in a curve that the vehicle is traveling along, said method comprising:
   using a processor programmed for:
      determining a radius of curvature of the curve, a width of the travel lane, and a length of the trailer;
      determining when the vehicle has entered the curve;
      determining a current steering angle of the vehicle;
      determining a current turn radius of the vehicle for traveling through the curve using the current steering angle;
      determining a turn radius of a rear end of the trailer using the current turn radius of the vehicle a wheel base of the vehicle, a distance from front wheels of the vehicle to a front bumper of the vehicle, a hitch length between the vehicle and the trailer, and a length of the trailer;
      determining that the trailer will cross out of the travel lane based on the radius of curvature of the curve and the turn radius of the trailer;
      calculating a start turn radius of the vehicle for a start location of the curve;
      calculating an end turn radius of the vehicle for an end location of the curve;
      determining a turning end point proximate the end location; and
      determining a desired path through the curve that prevents the trailer from crossing out of the lane and that starts at a beginning location of the curve, has a relatively wide turn through the curve, and ends before an ending location of the curve using the start turn radius, the end turn radius and the turning end point, wherein determining the desired path includes providing a revised road curvature value of $1/R_f$ and a change in rate of road curvature as $$\frac{2}{D(R_f - R_t)},$$

where $R_f$ is me current turn radius of the vehicle, $R_t$ is the turn radius of the trailer, and D is a tuning parameter to adjust for driver aggressiveness; and
   steering the vehicle using a steering system along the desired path through the curve.

14. The method according to claim 13 wherein determining the desired path includes solving a polynomial equation using initial and boundary conditions.

15. The method according to claim 14 wherein the initial conditions to solve the polynomial equation at the turning start point are:

$$y_n(0) = 0,$$

$$y'_n(0) = 0,$$

$$y''_n(0) = \frac{(v_x \Delta T)^2}{R_f L},$$

and the boundary conditions to solve the polynomial equation at the turning end point are:

$$y_n(1) = \frac{y_{lane}(v_x \Delta T) + L}{L},$$

$$y'_n(1) = y'_{lane}(v_x \Delta T) \cdot \frac{v_x \Delta T}{L},$$

$$y''_n(1) = \frac{2(v_x \Delta T)^2}{(3R_f - R_t)L},$$

where:

$$y_{lane} = c_3 x^3 + c_2 x^2 + c_1 x + c_0,$$

and where ( )' is a first order derivative, ( )'' is a second order derivative $R_f$ is the current turn radius of the vehicle, $R_t$ is the turn radius of the trailer, $y_{lane}$ is a polynomial representation of lane centering, and $c_0$-$c_3$ are coefficients of the polynomial equation given by lane sensing.

16. The method according to claim 13 wherein the start turn radius is $R_f$, the end turn radius is $$\frac{3R_f - R_t}{2},$$

and the turning end point before the end location of the curve is:

$$\sqrt{R_f^2 - \left(\frac{R_f + R_t}{2}\right)^2},$$

where $R_f$ is the current turn radius of the vehicle and $R_t$ is the turn radius of the trailer.

17. A method for providing vehicle steering control in an autonomously driven or semi-autonomously driven vehicle that is towing a trailer so as to prevent the trailer from crossing out of a travel lane in a curve that the vehicle is traveling along, said method comprising:
   using a processor programmed for:
      determining a radius of curvature of the curve, a width of the travel lane, and a length of the trailer;
      determining when the vehicle has entered the curve;
      determining a current steering angle of the vehicle;
      determining a current turn radius of the vehicle for traveling through the curve using the current steering angle;
      determining a turn radius of a rear end of the trailer using the current turn radius of the vehicle a wheel base of the vehicle, a distance from front wheels of the vehicle to a front bumper of the vehicle, a hitch length between the vehicle and the trailer, and a length of the trailer;

determining that the trailer will cross out of the travel lane based on the radius of curvature of the curve and the turn radius of the trailer;

calculating a start turn radius of the vehicle for a start location of the curve;

calculating an end turn radius of the vehicle for an end location of the curve;

determining a turning start point proximate the start location;

determining a desired path through the curve that prevents the trailer from crossing out of the lane and that starts after a beginning location of the curve, has a relatively narrow turn through the curve, and ends at an ending location of the curve using the start turn radius, the end turn radius and the turning start point, wherein determining the desired path includes providing a revised road curvature value of $1/R_f$ and a change in rate of road curvature as $$\frac{2}{D(R_f - R_t)},$$

where $R_f$ is me current turn radius of the vehicle, $R_t$ is the turn radius of the trailer, and D is a tuning parameter to adjust for driver aggressiveness; and steering the vehicle using a steering system along the desired path through the curve.

18. The method according to claim 17 wherein determining the desired path includes solving a polynomial equation using initial and boundary conditions.

19. The method according to claim 18 wherein the initial conditions to solve the polynomial equation at the turning start point are:

$$y_n(0) = 0,$$

$$y'_n(0) = 0,$$

$$y''_n(0) = \frac{2(v_x \Delta T)^2}{(3R_f - R_t)L},$$

and the boundary conditions to solve the polynomial equation at the turning end point are:

$$y_n(1) = \frac{y_{lane}(v_x \Delta T) + L}{L},$$

$$y'_n(1) = y'_{lane}(v_x \Delta T) \cdot \frac{v_x \Delta T}{L},$$

$$y''_n(1) = \frac{2(v_x \Delta T)^2}{R_f L},$$

where:

$$y_{lane} = c_3 x^3 + c_2 x^2 + c_1 x + c_0,$$

and where ( )' is a first order derivative, ( )" is a second order derivative $R_f$ is the current turn radius of the vehicle, $R_t$ is the turn radius of the trailer, $y_{lane}$ is a polynomial representation of lane centering, and $c_0$-$c_3$ are coefficients of the polynomial equation given by lane sensing.

20. The method according to claim 18 wherein the start turn radius is $$\frac{3R_f - R_t}{2},$$

the end turn radius is $R_f$, and the turning start point after the start location of the curve is:

$$R_f^2 - \left(\frac{R_f + R_t}{2}\right)^2,$$

where $R_f$ is the current turn radius of the vehicle and $R_t$ is the turn radius of the trailer.

* * * * *